April 3, 1945.　　　C. JOBST　　　2,372,833
INJECTION MOLDING MACHINE
Filed Feb. 11, 1941　　　11 Sheets-Sheet 1

INVENTOR
Conrad Jobst,
BY
ATTORNEYS

April 3, 1945.  C. JOBST  2,372,833
INJECTION MOLDING MACHINE
Filed Feb. 11, 1941   11 Sheets-Sheet 2

INVENTOR
Conrad Jobst,
BY
ATTORNEYS

April 3, 1945.    C. JOBST    2,372,833
INJECTION MOLDING MACHINE
Filed Feb. 11, 1941    11 Sheets-Sheet 3
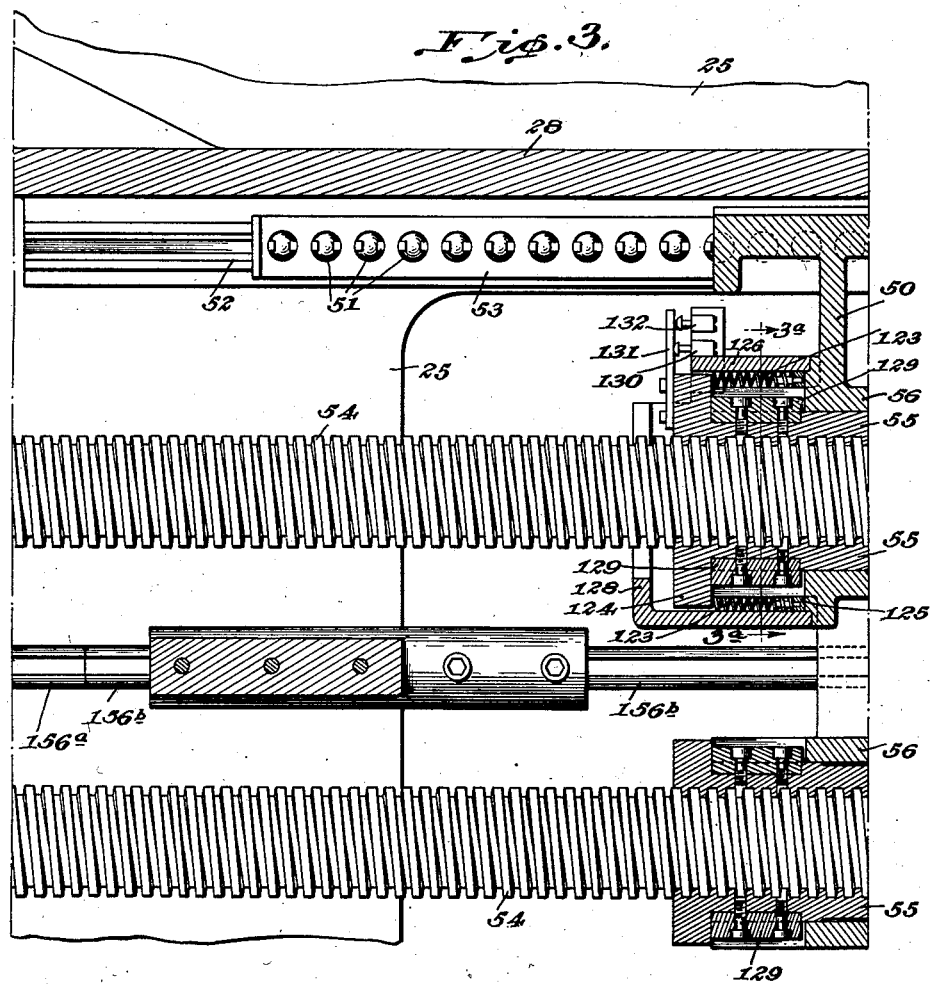
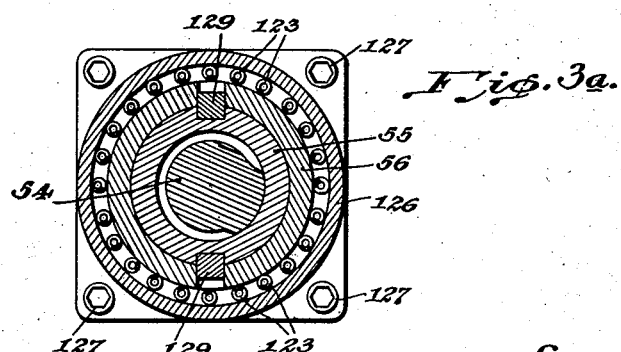
INVENTOR
Conrad Jobst,
BY
ATTORNEYS April 3, 1945.                 C. JOBST                       2,372,833
                         INJECTION MOLDING MACHINE
                  Filed Feb. 11, 1941         11 Sheets-Sheet 4

INVENTOR
Conrad Jobst,
BY
ATTORNEYS

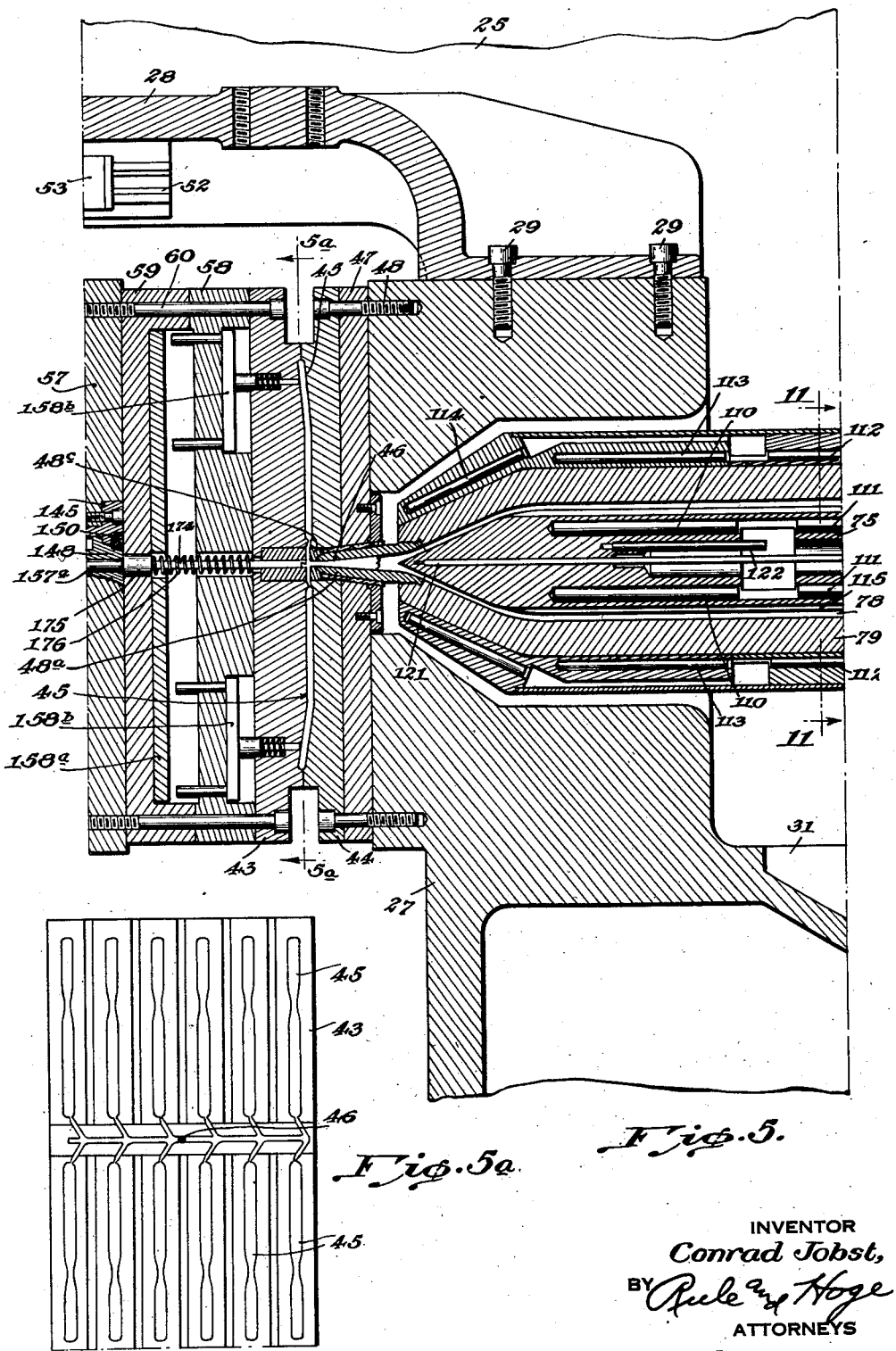

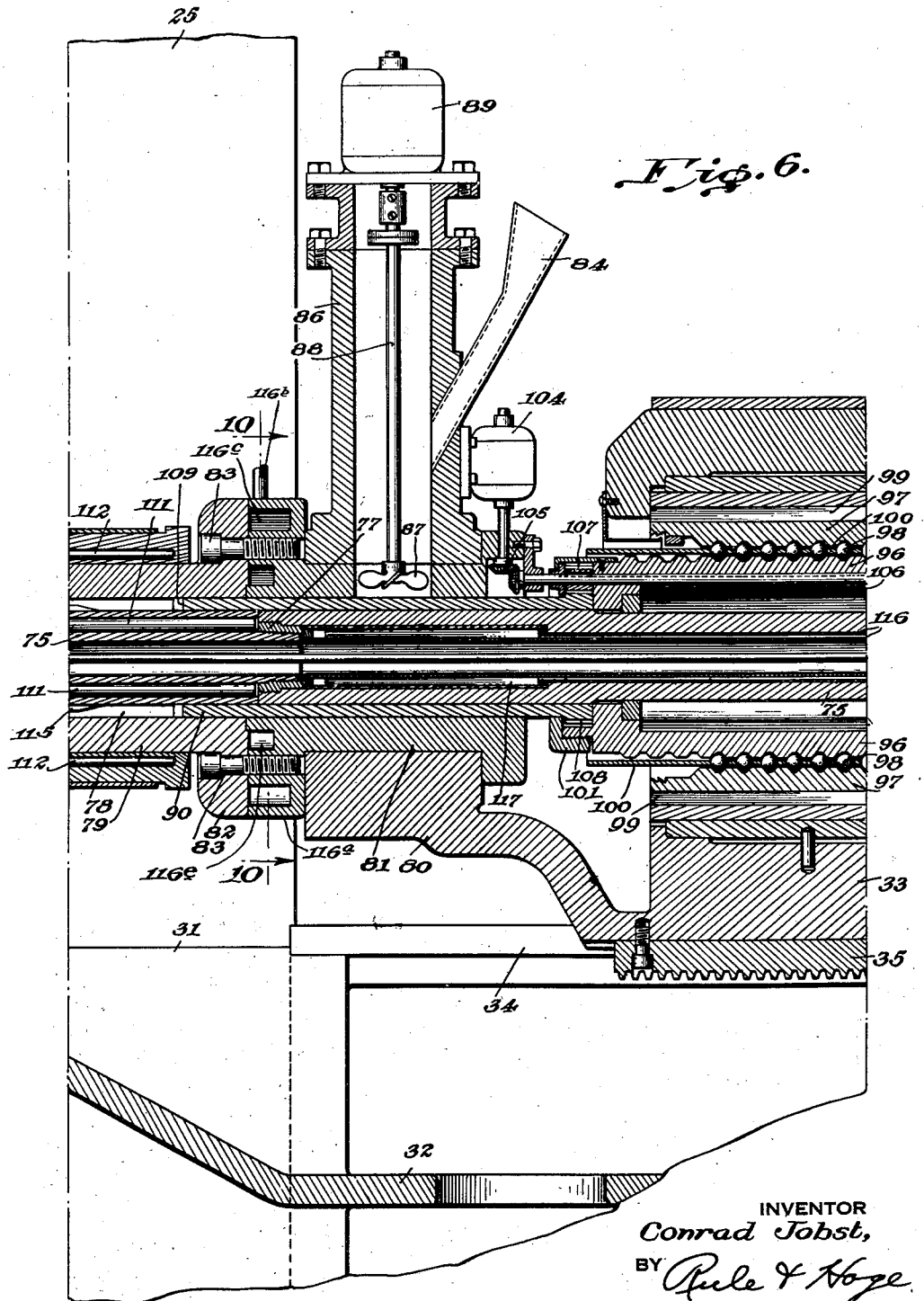

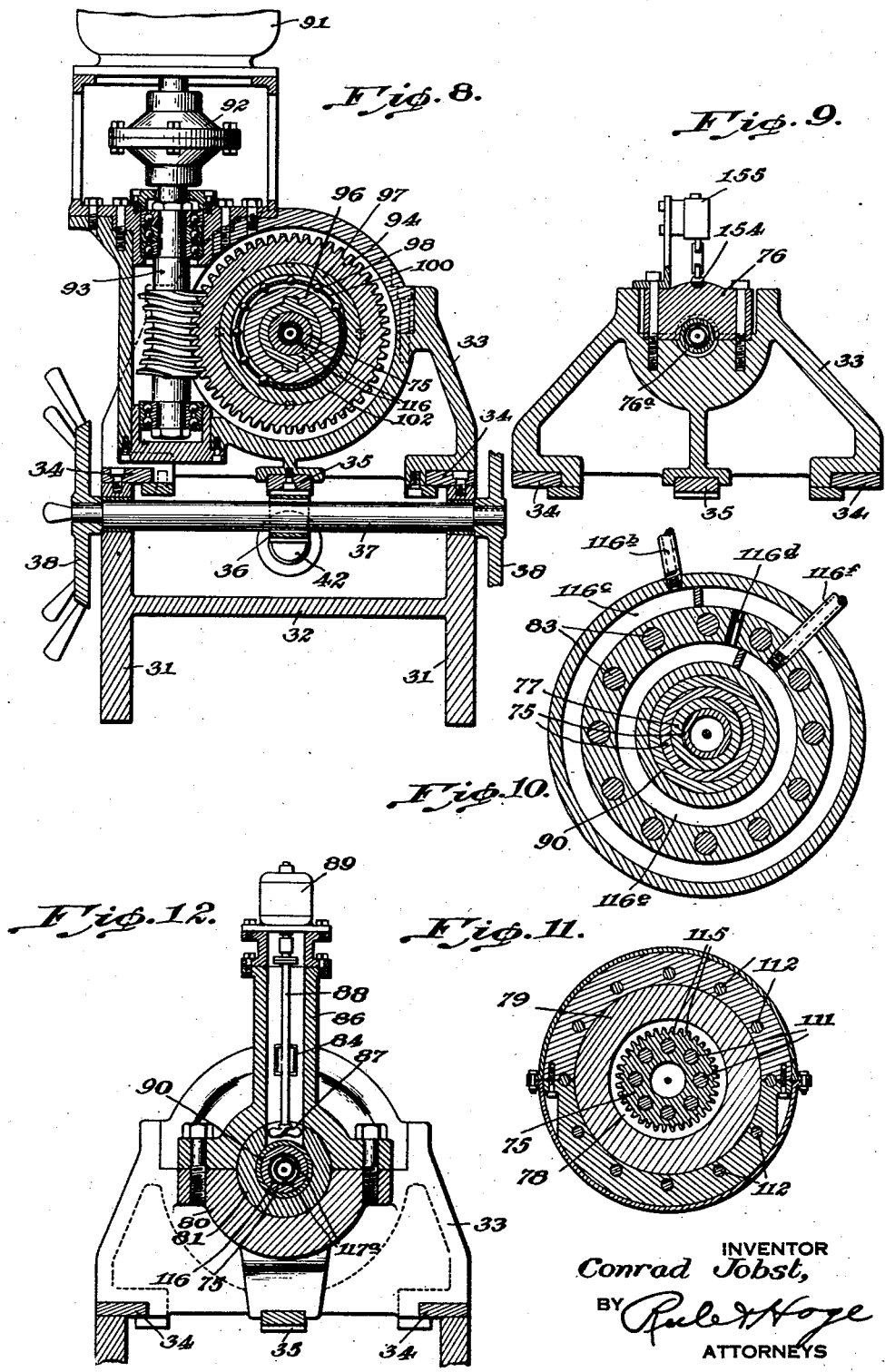

April 3, 1945.  C. JOBST  2,372,833
INJECTION MOLDING MACHINE
Filed Feb. 11, 1941  11 Sheets-Sheet 9
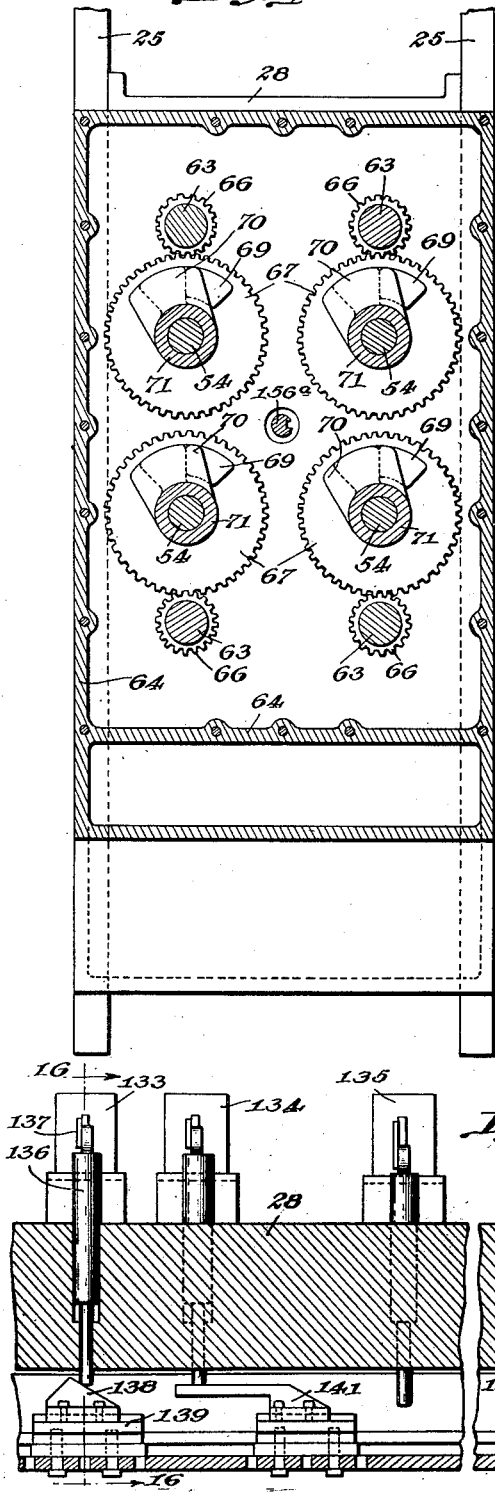
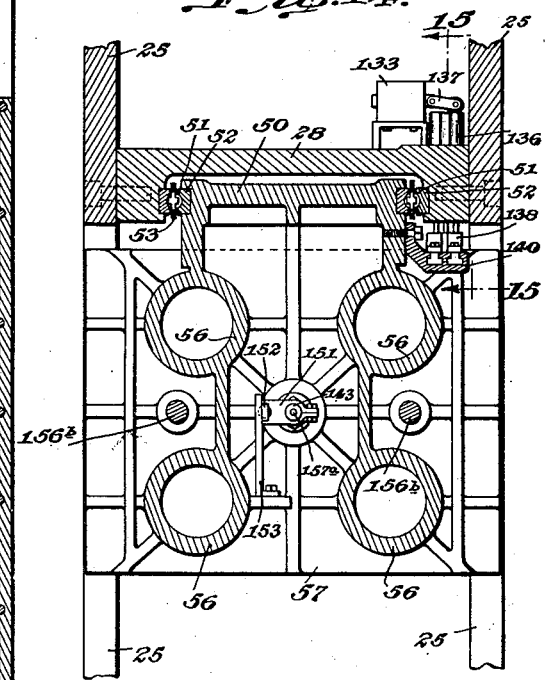
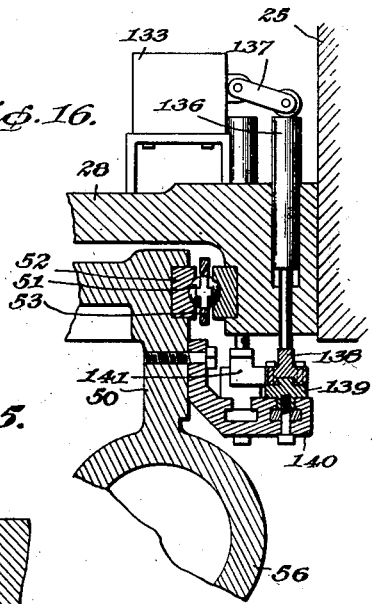
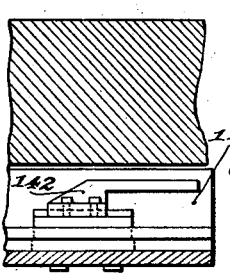
INVENTOR
Conrad Jobst,
BY
ATTORNEYS April 3, 1945. C. JOBST 2,372,833
INJECTION MOLDING MACHINE
Filed Feb. 11, 1941 11 Sheets-Sheet 10
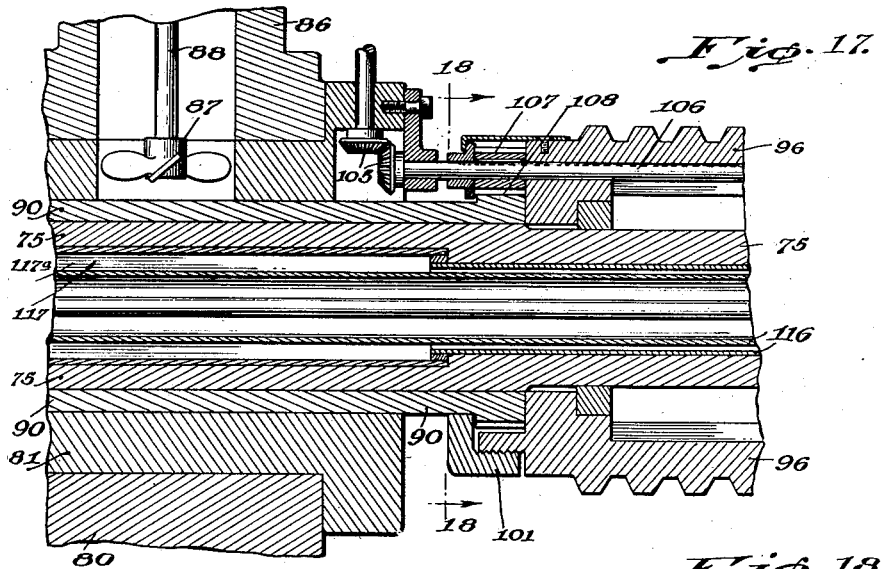
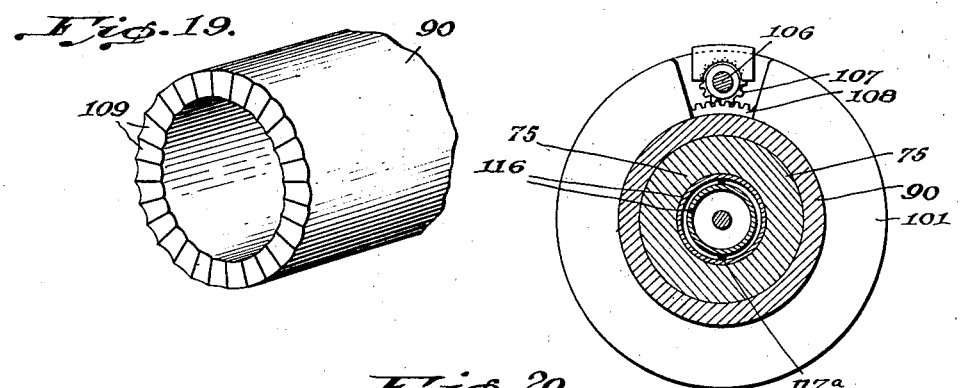
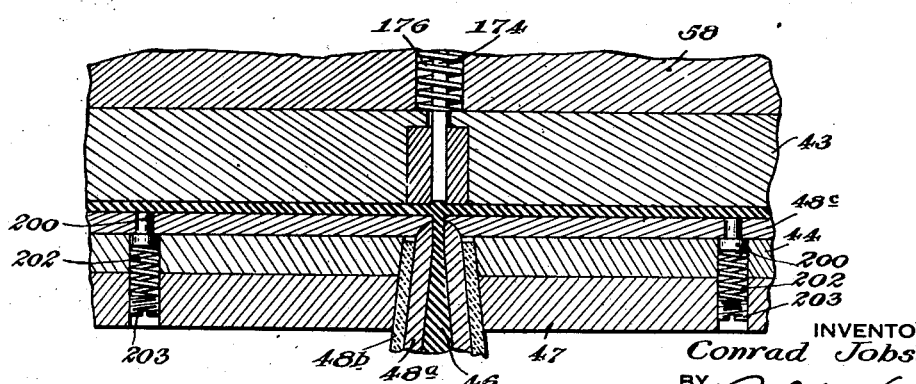
INVENTOR
Conrad Jobst,
BY
ATTORNEYS

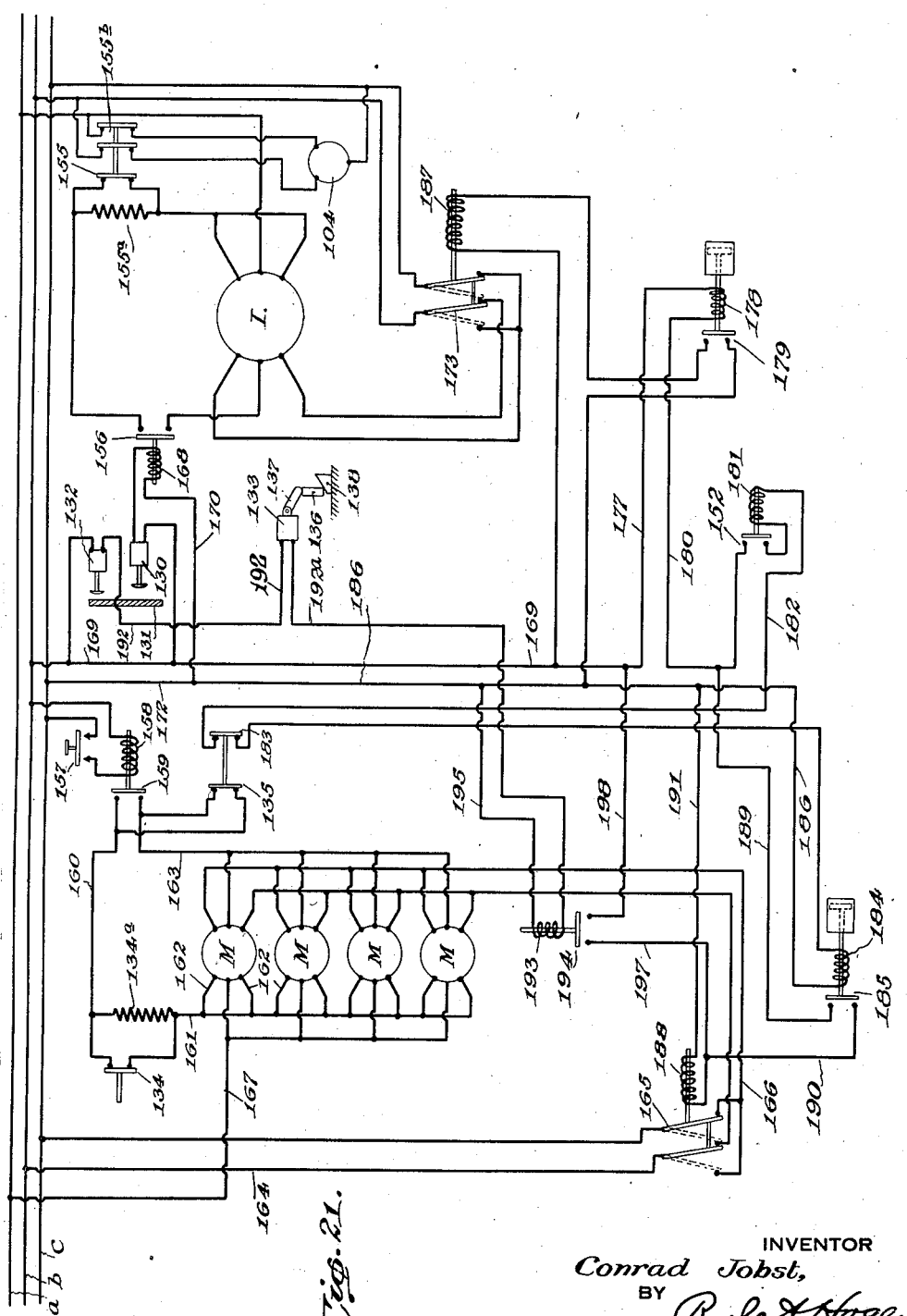

Patented Apr. 3, 1945

2,372,833

UNITED STATES PATENT OFFICE 2,372,833

INJECTION MOLDING MACHINE

Conrad Jobst, Toledo, Ohio

Application February 11, 1941, Serial No. 378,399

29 Claims. (Cl. 18—30)

My invention relates to machines for molding thermoplastic materials and particularly to machines for manufacturing castings or molded articles from organic molding materials of the thermosetting type, which materials are supplied to the machine in granulated or powdered form, heat treated to convert them into a plastic condition and injected under pressure into the molds in which the material sets and hardens.

An object of my invention is to produce a machine which by overcoming various defects and difficulties encountered in prior art machines, is operative to mold articles of superior quality and free from defects incident to prior art methods. In the manufacture of thermoplastic articles by injection methods very high pressures are ordinarily employed for injecting the material into the molds and holding the molds closed while the material sets and hardens. Hydraulic mechanism is ordinarily employed for such purpose, the hydraulic pressure being transmitted through toggle mechanisms designed to permit the building up of extremely high pressures. After the material has been heated and injected in a viscous condition into the mold, there is a certain amount of expansion of the material as it cools. This expansive force is practically irresistible so that enormous pressure is built up within the molds, requiring a correspondingly great hydraulic pressure to be maintained if the molds are to be held closed. With hydraulic operation it has been found impractical or impossible to hold the molds properly closed during such expansion of the material. This is due in part to inherent defects in hydraulic operation. The oil ordinarily used has a creeping power which is not under control and the functioning of the oil is sluggish. The toggle devices where used for locking the mold in closed position are subject to wear and also wear unevenly so that their effectiveness for holding the molds tightly closed is quickly reduced. As a result the material as it cools and expands forces the meeting edges of the molds apart, the material being forced out. In order to overcome this flashing, it is customary to keep the temperature down to avoid excessively high pressures from being built up. This reduced temperature is insufficient to produce a completely homogeneous and plastic condition of the material. This results in inferior and defective ware.

An object of the present invention is to overcome the above difficulties. To this end there is provided mechanism for locking the molds in closed position, including means for forming a solid unyielding backing for the mold sections by which they are held tightly closed against the highest pressures developed therein. The invention further provides novel pressure equalizing means operative to prevent excessive pressures from being developed within the molds. The invention thus further permits and provides for the use of adequate heating of the molding materials needed to fully plasticize them as required to produce superior ware.

I have discovered, moreover, that with adequate pressure equalizing and controlling means as provided by the present invention, permitting complete plasticizing and softening of the molding material, the molds may be completely filled and the curing and hardening of the material completed without developing the very high pressures which have heretofore been employed and found necessary in practicing prior art methods.

A further object of the invention is to provide a machine in which the mold sections may be brought together by means of electric motors operating through screw-threaded driving means reacting against solid abutments, such abutments providing a solid unyielding backing for the mold sections when said sections are brought to closed position, and further permitting a constant holding force to be maintained by means of reduced torque applied to the motors.

A further object of the invention is to provide for holding the molds firmly closed with a solid backing, without the necessity of applying excessive pressures to the molds. In prior art mechanisms, particularly in the use of hydraulic means, the enormously high pressures applied to the mold sections as deemed necessary in attempting to hold the molds properly closed, is destructive of the molds, causing bending or distortion of the mold sections and wear of the mold faces. This difficulty is overcome by the present invention in which the molds are held closed by means of a solid backing without requiring a high pressure to be applied at the meeting faces of the molds.

A further object of my invention is to provide automatic means for protecting the molds in the event of any fragments or pieces of hardened molding material or any other obstructing materials coming between the mold sections or meeting faces thereof while the mold is being closed. Any such obstructing material coming between the mold faces and subjected to the high pressures ordinarily used, is ruinous to the molds as such material is embedded in or otherwise mutilates the mold face. This has proved to be a serious difficulty in the present are owing to the fact that the molds must be made with precision and are expensive to replace, and it is difficult to prevent such foreign bodies and materials from frequently getting between and ruining the mold sections. An object of the present invention is to overcome this difficulty and to this end there is provided electro-responsive means for automatically stopping the mold closing motors in the event of any obstructing material interfering with the normal closing movements, such means operating before an injurious pressure has been developed.

A further object of the invention is to provide improved means for effecting an even distribution of the molding material in its passage through the heating chamber to the molds, thereby insuring uniform heating of the material. The invention further provides means for insuring all of the particles of molding material being maintained in the heating chamber substantially the same length of time while passing therethrough, resulting in uniform heating and a homogeneous condition of the plasticized material.

A further object of the invention is to provide means for preventing heated molding material from mixing with the cold material as it commences its passage through the heating chamber.

Other objects of the invention will appear hereinafter.

Referring to the accompanying drawings which illustrate a machine embodying the principles of my invention:

Fig. 1 is a side elevation of the machine.

Figs. 2 to 7 inclusive together provide a composite view of the machine in sectional elevation, these views when placed side by side in the order of the figure numbers, illustrating substantially the complete machine. Figs. 5, 6 and 7 are sections at the longitudinal center line of the machine, that is, along the axis of the injector, while the sections of Figs. 2, 3 and 4 are in a plane offset laterally from said center line to illustrate the mold closing spindle mechanism.

Fig. 3ᵃ is a section at the line 3ᵃ—3ᵃ on Fig. 3.

Fig. 5ᵃ is a section at the line 5ᵃ—5ᵃ on Fig. 5.

Fig. 8 is a cross-sectional elevation at the line 8—8 on Fig. 1, illustrating the driving mechanism for the injector plunger.

Fig. 9 is a section at the line 9—9 on Fig. 1.

Fig. 10 is a section at the line 10—10 on Fig. 6.

Fig. 11 is a section at the line 11—11 on Fig. 5.

Fig. 12 is a section at the line 12—12 on Fig. 1, showing means for feeding molding material to the injector.

Fig. 13 is a section at the line 13—13 on Fig. 2, showing gearing connecting the mold closing spindles with their driving motors.

Fig. 14 is a section through the mold carriage at the line 14—14 on Fig. 4.

Fig. 15 is a fragmentary sectional view of microswitches and their control devices shown in Fig. 1.

Fig. 16 is a section at the line 16—16 on Fig. 15.

Fig. 17 is a fragmentary sectional elevation of the injector mechanism and shows particularly the means for rotating the injector plunger.

Fig. 18 is a section at the line 18—18 on Fig. 17.

Fig. 19 is a fragmentary perspective view of the rotary injector plunger.

Fig. 20 is a fragmentary sectional view showing the tip of the injector nozzle, expansion control devices and means for ejecting articles from the mold.

Fig. 21 is a wiring diagram of the electrical equipment.

Figure 1:
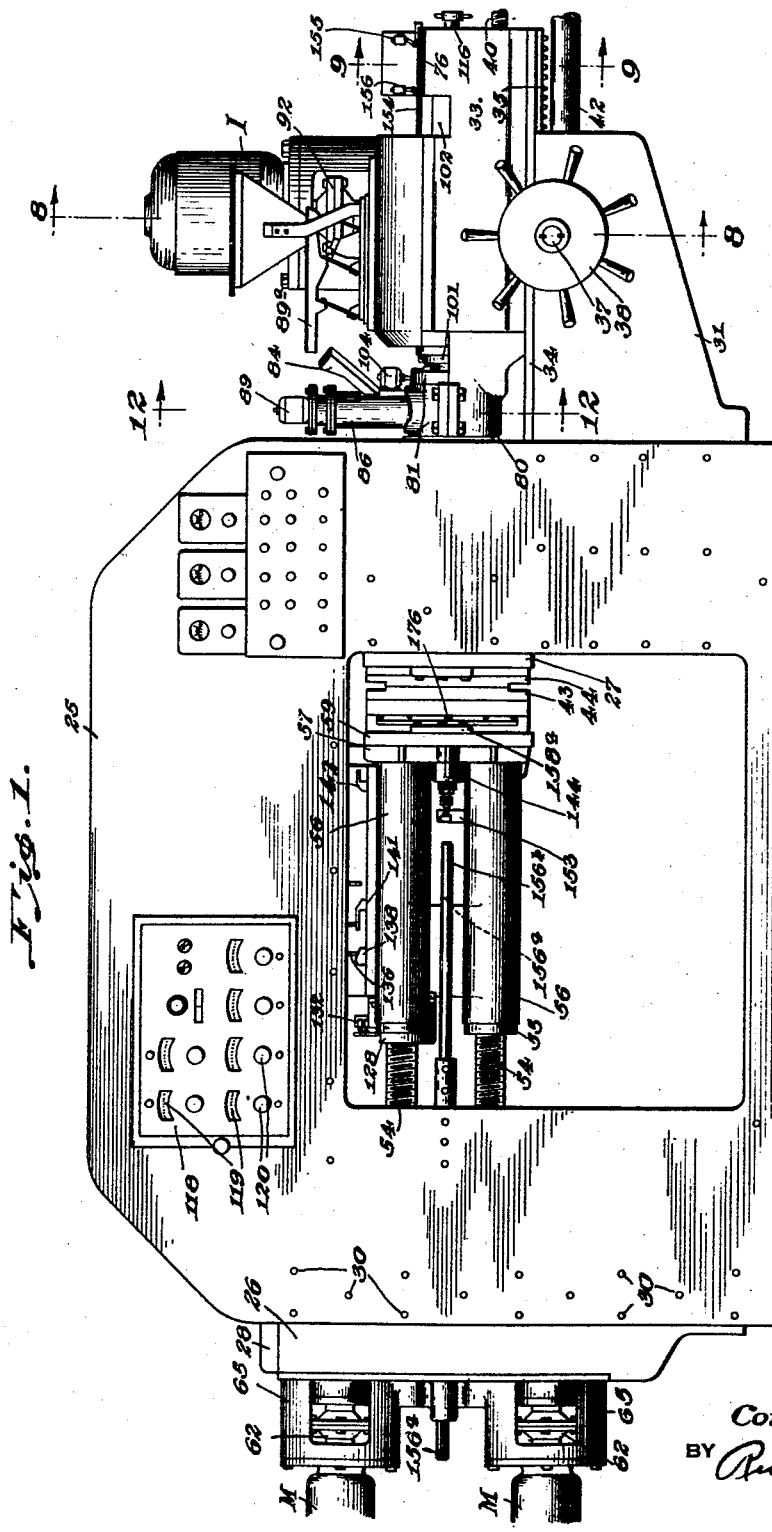

The framework of the machine comprises vertically disposed parallel plates 25 forming the sides of the frame, a vertically disposed end abutment plate 26 (Fig. 2) at one end of the machine, an inner abutment plate 27 (Fig. 5) and a horizontally disposed tie plate 28 extending lengthwise of the machine between the abutment plates. The ends of the plate 28 seat on the upper ends of the abutment plates and are bolted thereto by bolts 29. The side plates 25 are attached to said abutment plates and also to the tie plate 28 by attaching means 30 such as bolts or rivets. The inner abutment plate 27 has cast integral therewith an extension frame 31 comprising side plates (Figs. 1, 5, 6, 7, 8) and a connecting web 32.

The frame 31 provides a support for a carriage 33 which carries the injector mechanism. The carriage 33 is mounted for movement lengthwise of the machine, being supported and guided on rails 34 attached to the frame 31. The injector mechanism as a whole is movable to and from its operative position shown on the drawings, by means of a rack bar 35 bolted to the under side of the carriage and having rack teeth to run in mesh with a pinion 36 keyed to a shaft 37 journaled in the frame 31. The shaft is rotated by means of a hand wheel or hand wheels 38 (Fig. 8) keyed to one or both ends of the shaft. This construction permits the injector mechanism to be retracted into a convenient position for making any required changes of parts, repairs, etc. The injector carriage is normally secured in its operative position by a stop screw 40 (Figs. 1 and 7) adjustably mounted in a rock arm 41 keyed to a rock shaft 42 journaled in the frame 31. By rocking the shaft 42 the stop screw may be swung upward from its inoperative position (Fig. 7) into position to engage the outer end of the injector carriage and form a positive means for holding the latter in operative position.

The mold comprises partible mold sections 43 and 44 (Figs. 5, 5ᵃ) having abutting faces meeting in a vertical plane. The mold sections as shown are formed with a multiplicity of mold cavities 45. The molding material is injected into the molds through an injector nozzle which opens into a manifold channel or sprue 46 having branch openings into the mold cavities. The mold section 44 is mounted on the abutment plate 27. A platen 47 interposed between the mold section and the plate 27 provides a backing for the mold, the parts being removably attached to the plate 27 by screw bolts 48. The plunger tip or nose 48ᵃ (Fig. 20) projects through a bushing 48ᵇ in the platen 47 and the forward end of the tip abuts a plate 48ᶜ inset in the mold section 44.

The mold section 43 is carried on a mold carriage 50 (see Figs. 3, 4 and 14) mounted for reciprocating movement lengthwise of the machine. Bearings for the mold carriage comprise the bearing balls 51 which run on tracks or raceways 52 mounted respectively on the tie plate 28 and the carriage 50. The bearing balls are held in position by spacing strips or cages 53. The mold carriage is reciprocated by means of motor driven screw-threaded shafts 54, herein referred to as drive shafts or spindles. These have screw-threaded connections with internally threaded sleeves or nuts 55 mounted in cylinders 56 aligned with the screw shafts. These cylinders are formed integral with a vertical face plate 57 (Figs. 4 and 5) of the mold carriage. The mold section 43 is backed by a platen 58 which in turn abuts a plate 59 bearing against the face of the plate 57, the parts 43, 58 and 59 being removably attached to the carriage by screw bolts 60.

The driving spindles 54 are rotated by electric motors M (Fig. 1) individual thereto. The motor shafts 61 (Fig. 2) are connected by shaft couplings 62 to shafts 63 having bearings in the abutment plate 26. Said abutment plate is formed with an integral marginal flange portion 64 (Figs. 2, 13) to which is bolted a casting 65. The latter is formed to provide housings for the shaft couplings 62 and together with the abutment plate 26 provides a housing for the shafts 63 and gearing driven thereby. Each shaft 63 is formed with a driving pinion 66, which pinions mesh with spur gears 67 mounted to rotate freely on bushings 68 in which the spindles 54 are journaled. A driving connection between each spindle 54 and its driving gear 67 includes a lug 69 on the gear 67 and a lug 70 formed on a hub or sleeve 71 secured to the end of the spindle shaft 54.

As shown, there are four driving spindles so arranged that the driving force of each spindle is applied in a direction perpendicular to the mold plate and adjacent one corner thereof. In this manner there is a substantially uniform mold closing pressure applied throughout the area of the mold plate. When the motors are driven in a forward direction and the mold thereby closed, the motors are brought to rest. The current is not cut off from the motors when the mold closes, but electrical resistance is introduced into the motor circuits so that a driving force is maintained at a reduced torque, all as hereinafter set forth. This serves to positively prevent any backward or opening movement of the mold because any pressure built up therein, no matter how great, would be insufficient to drive the spindles backward against the torque of the motors. The abutment plate 26 provides with the screw spindles and mold carriage a solid abutment so that there can be no backward movement of the mold section without compressing the metal. Thrust bearings 72 (Fig. 2) are interposed between the abutment plate and flanges 73 on the spindles to take the end thrust of the spindles.

The injector mechanism includes an inner tubular shaft or spindle 75 (Figs. 6, 7 and 17) mounted in the carriage 33 and held against lengthwise movement by annular ribs 76ª formed thereon and engaging corresponding grooves in a cap block 76 (Figs. 7, 9) bolted to the carriage. This spindle is made in two sections connected by a connecting ring 77 having outer and inner screw-threaded engagement with said sections respectively. Surrounding the forward section of the spindle 75 and spaced therefrom to provide an annular passageway 78, is an outer spindle section or tube 79 which, as shown in Figs. 5 and 6, is substantially coextensive in length with the forward section of the inner spindle 75. A bearing block 80 (Figs. 6, 12) on the injector carriage has mounted therein a bushing 81, the forward end of which is flanged as at 116ª to provide an abutment surface for the flanged end 82 of the tube 79, the parts 79 and 81 being secured together by screw bolts 83. The molding material in granular or powdered form is fed through a chute 84 into a tower 86 bolted to the block 80. The material is fed or forced from the tower through an opening in the bushing 81, into the passageway 78 by means of a paddle wheel or propeller 87 on the lower end of a shaft 88 extending upwardly through the tower and driven by an electric motor 89. A conventional vibrator 89ª (Fig. 1) delivers the molding material intermittently in measured charges to the chute 84.

The molding material is fed forward through the passageway 78 to the mold and compacted within the mold by means of a tubular injector plunger 90 (Figs. 6, 17, 18, 19) which surrounds the inner spindle 75 and is reciprocated lengthwise within the annular passageway 78. The mechanism for reciprocating the plunger is as follows:

An electric motor I (Figs. 1, 8) has, herein referred to as the injection motor, driving connection through a coupling 92 with a worm shaft 93 on which is a worm running in mesh with a worm gear wheel 94 (Figs. 7 and 8) journaled in the injector carriage for rotation about the axis of the injector spindle. The worm gear has driving connection with a thrust driving mechanism comprising an inner tubular shaft 96 and an outer tubular shaft 97. The shaft 96 is screw-threaded or provided on its outer surface with a spiral groove to receive thrust bearing balls 98 which also run in corresponding spiral grooves in the inner surface of the shaft 97. The worm gear 94 is keyed to the shaft 97 for rotating it by means of keys 99. The bearing balls 98 are held in place by a cage 100. The rear end of the plunger 90 abuts the forward end of the shaft 96 which drives the plunger forward. The plunger is connected to the shaft to be retracted thereby, by means of a flanged collar 101 threaded onto said shaft. The construction is such that the plunger 90 is rotatable independently of the shaft 96 and relative thereto by means hereinafter described.

The thrust shaft 96 is held against rotation by means of a bushing 102 (Figs. 7 and 8) keyed to the carriage block and formed with ribs having a slidable connection with the shaft. Rotation of the worm gear 94 and the shaft 97 therewith operates through the thrust bearings to impart lengthwise movement to the shaft 96 for reciprocating the injector plunger 90. Thrust bearings 103 take up the thrust or back pressure of the tube 97 as the injector plunger is moved forward.

When the plunger 90 is fully retracted, the forward end thereof is moved back beyond the lower, open end of the tower 86, permitting the molding material to enter the passageway 78. When the plunger moves forward, the material is forced through the passageway to the mold. In order to obtain a uniform distribution of the material throughout the circumference of the passageway 78, provision is made for rotating the plunger. The means for effecting such rotation includes a motor 104 (Fig. 6) operating through bevel gearing 105 to rotate a shaft 106 (Figs. 17, 18) having a bearing in the forward end of the tubular shaft 96. A pinion 107, splined on the shaft 106, runs in mesh with an annular gear 108 formed on the outer end of the plunger 90. The spline connection of the shaft 106 and gear 107 permits the gear to slide along the shaft as the thrust driving shaft 96 is reciprocated. The front end surface of the plunger 90 is formed with corrugations or teeth 109 (Fig. 19) which as the plunger rotates insure a proper distribution of the molding material within the channel 78 and cause more or less of a circular movement of the material within the channel.

Means for heating and plasticizing the molding powder as it advances through the injector and for regulating the temperature, comprises a plurality of sets of electrical heating elements. These include a front set 110 and a rear set 111 (Figs. 5 and 6) both mounted in openings in the forward section of the inner spindle 75. Surrounding the outer spindle shaft 79 are additional sets of heating elements including a rear set 112, an intermediate set 113, and a front set 114. Each of said sets of heaters may be arranged in an annular series as shown in Fig. 11. The inner heaters 110 and 111 are particularly effective as there is little or no opportunity for heat losses, practically all the heat generated being transmitted to the molding material. In order to further increase the effectiveness of the heating means, the spindle 75 is formed with longitudinal ribs or fins 115 (Figs. 5, 11) providing a large metal contact surface over which the molding material is distributed and permitting the heat to be effectively transmitted to such material.

In order to localize the heating operation, control the temperature of the plunger 90, and prevent heating of the material until brought into the zone of the heating elements, cooling means is provided for circulating a cooling fluid within the inner tubular spindle 75. Such cooling means comprises concentric sheet metal tubes 116 (Figs. 6, 7, 17) extending lengthwise through the spindle and defining a tubular passageway opening at its inner end into a cooling chamber 117. Baffles 117a (Fig. 12) are provided to direct the circulation of fluid within said chamber.

Additional cooling means designed particularly to prevent heat from the electrical heating elements being transmitted to the molding material before the latter is moved forward through the channel 78, comprises a system for circulating a cooling fluid through the flanged end 116a (Figs. 6 and 10) of the bushing 81. The cooling fluid is admitted through a pipe 116b to an annular passageway 116c through which it is conducted, and thence through an opening 116d to an inner annular channel 116e and through the latter to a discharge pipe 116f.

An electrical board 118 (Fig. 1) is provided with indicators 119 individual to the groups of heating elements, and adjusting devices 120 whereby the heaters may be set for maintaining desired temperatures. A potentiometer point 121 is located at the forward end of the injector to indicate the temperature where the material enters the mold. Another potentiometer 122 (Fig. 5) is located adjacent the heater elements 110, indicating the temperature at a point more remote from the mold. Still other potentiometers may be placed at convenient positions to indicate temperatures at any desired points within the heating zone.

Referring to Figs. 3 and 3a, I have provided safety mechanism for limiting the mold closing pressure applied to the molds in the event of any obstructing material coming between the mold faces or interfering with normal closing of the mold. Such mechanism includes spring means by which the forward movement of one or more of the spindles 54 is transmitted to the cylinder 56. As shown in Figs. 3 and 3a, an upper spindle 54 is equipped with such spring means. This includes an annular series of coil springs 123 which are held under compression between an end flange 124 on the sleeve 55 and a ring 125 mounted on the front end face of the cylinder 56. The ring carries centering pins for holding the springs in position. A cylindrical casing 126, attached by bolts 127 to the carriage, surrounds the series of springs 123 and is formed with an end wall 128 against which the flange 124 abuts when the sleeve 55 is retracted. During the normal mold closing movement the pressure of the flange 124 against the springs is insufficient to compress them until the mold sections are brought together. The continued rotation of the spindle 54 then serves to move the threaded sleeve 55 forward relative to the carriage as shown in Fig. 3, thereby compressing the springs. Keys 129 attached to the threaded sleeve 55 prevent rotation of the sleeve within the tube 56 and also limit the forward movement of said sleeve.

During the compression of the springs 123 a Micro-switch 130 is actuated by an arm 131 attached to the sleeve 55. This serves to start the injector motor as hereinafter set forth. A second Micro-switch 132 is adapted to be operated by the arm 131 and functions as a safety switch in the event of an obstruction interfering with the normal closing of the mold. The switch 132 is moved to closed position during the compression of the springs as the sleeve 55 is advanced after the carriage 50 has been arrested by such an obstruction. The switch 132 when thus closed operates through a relay to throw the reversing switch for the motors M and cause the mold carriage to be withdrawn as pointed out hereinafter. The circuit for the switch 132 is opened by the closing movement of the mold so that the switch is ineffective when operated by the arm 131 when the mold is closed normally.

Figure 2:
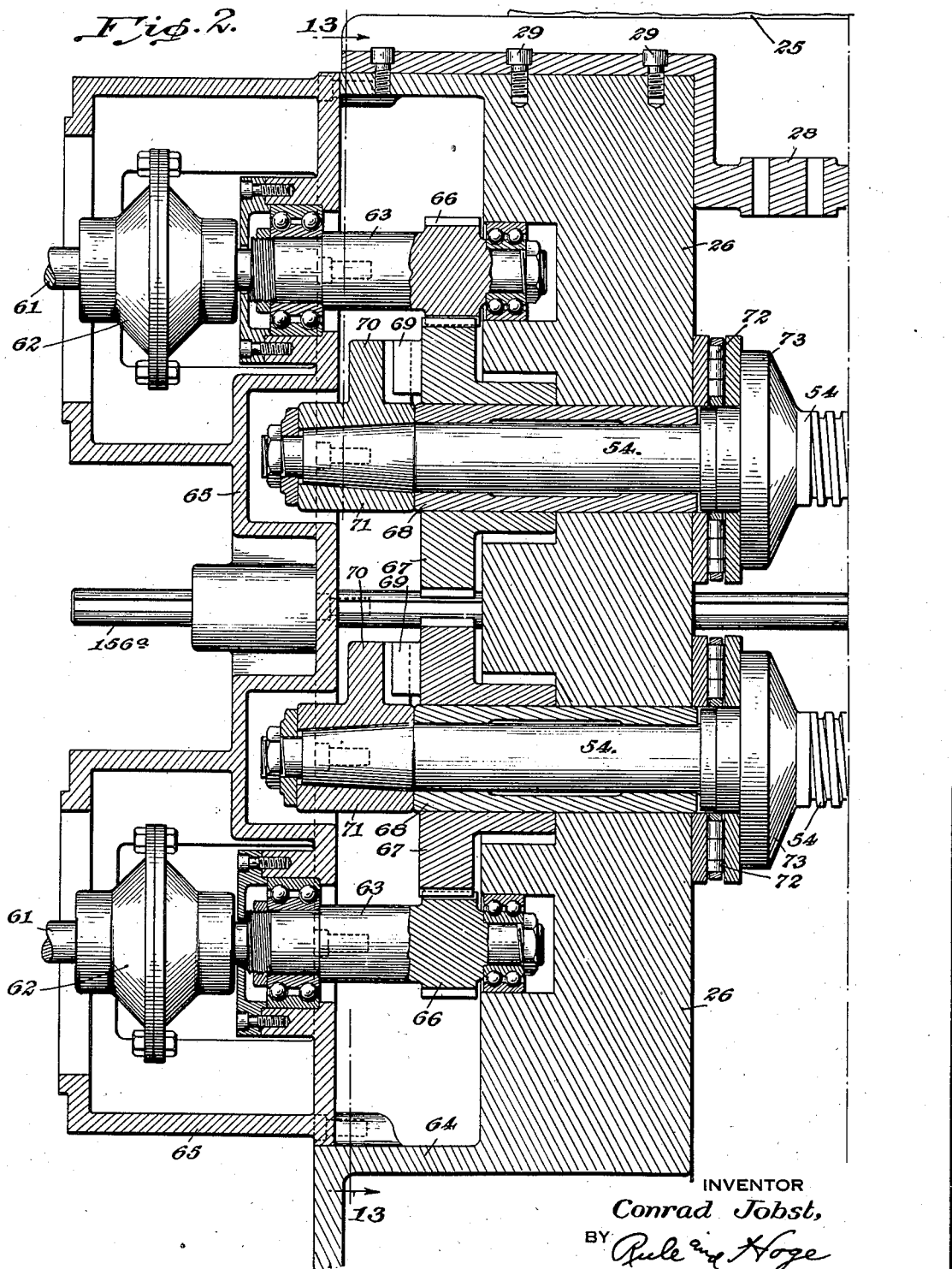

Referring to Figs. 1, 15 and 16, a series of Micro-switches 133, 134 and 135 are mounted on the machine frame and are operated by cams on the mold carriage for controlling various operations of the machine as will be described later. The switch 133 (see Figs. 15, 16) is actuated by a plunger 136 operating through means including an arm 137. The plunger in turn is actuated by a cam 138 mounted for adjustment on a supporting block 139 which in turn is adjustably mounted in a supporting bar or bracket 140 (Figs. 14, 15) attached to the mold carriage 50. The switch 133 is opened by its cam as the mold is closed. The functions of the switch 133 will appear more fully later. The switch 134 is actuated by a cam 141 and serves to introduce resistance into the field circuit of the motors M as hereinafter described. The switch 135 is actuated by a cam 142 as the carriage is retracted to stop the motors.

Figure 4:
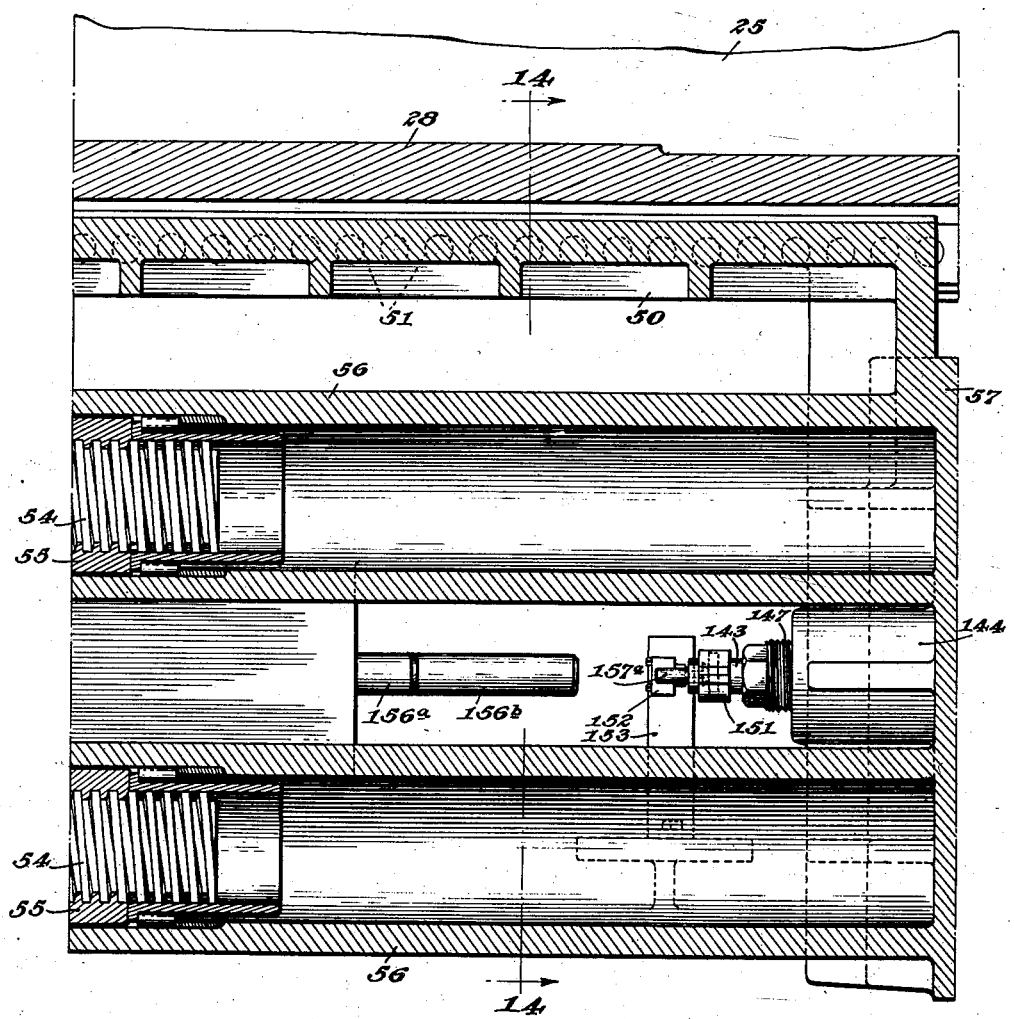
Figure 4A:
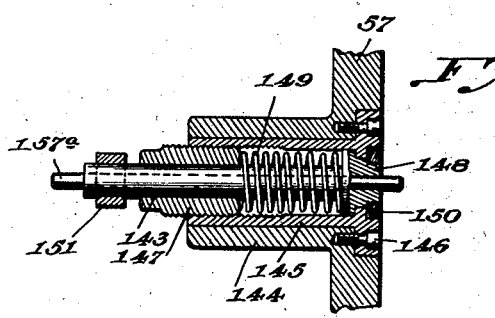

Switch mechanism is provided as shown in Figs. 4 and 4a, which is actuated by the back pressure of the molding material when the molds are filled for controlling various operations as hereinafter described. Such mechanism includes a rod 143 mounted for a very limited lengthwise movement in the mold carriage. The latter is formed with a tubular casing 144 in which is a sleeve 145 attached thereto by screws 146. A screw-threaded plug 147 mounted in said sleeve is adjustable therein for adjusting the compression of a coil spring 149 housed within the sleeve and held under compression between the plug and a head 148 on the rod 143, which head limits the forward movement of the rod. A collar 150 threaded on the head 148 permits a very limited backward movement of the rod. An arm 151 attached to the rod 143 provides an operating connection between said rod and a Micro-switch 152 mounted on a support 153. The switch 152 is actuated, by means to be described, when a predetermined pressure of the molding material has been built up within the mold by the injector plunger 90, and operates various electrical controlling devices as pointed out hereinafter.

Figure 7:
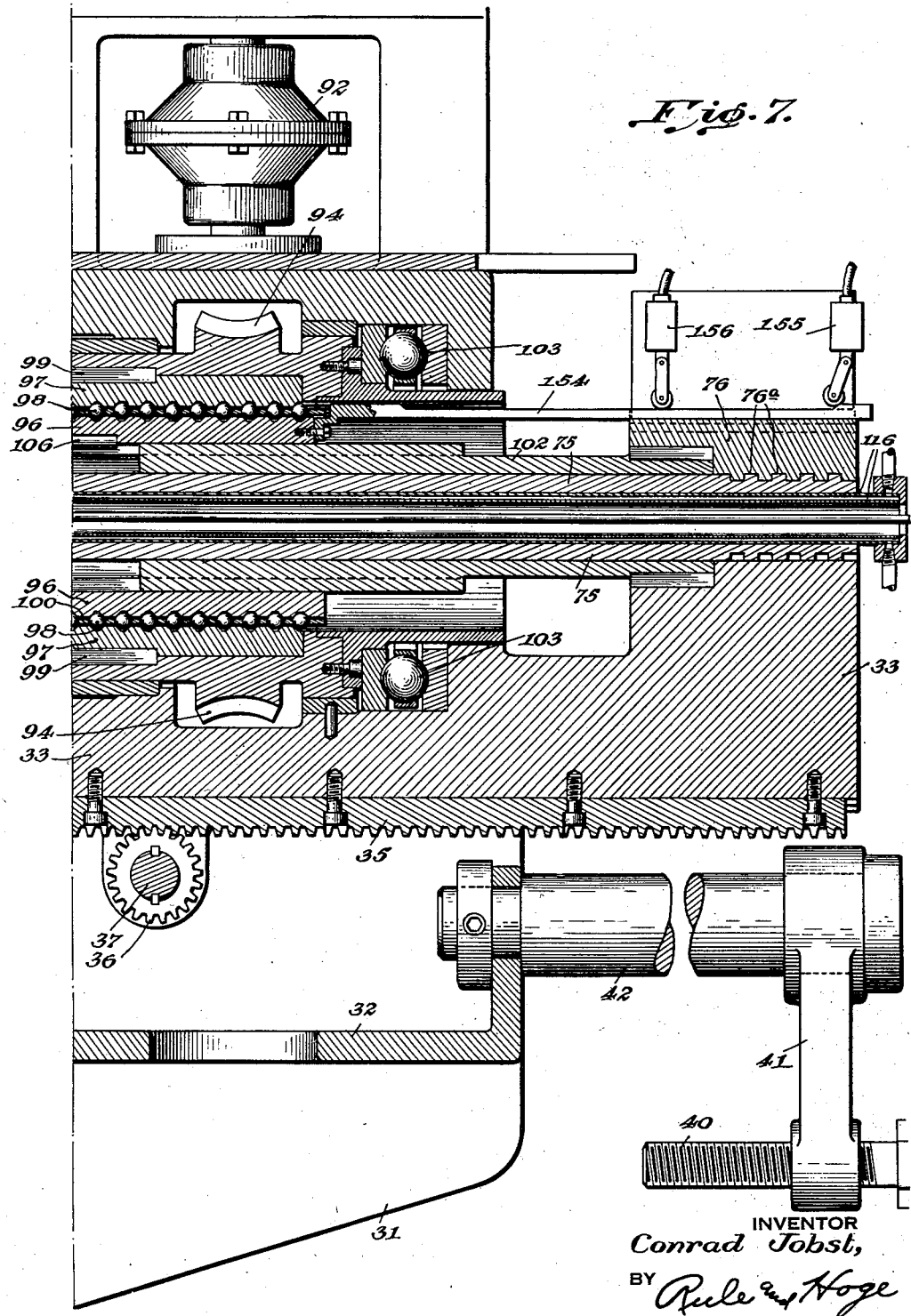

Referring to Fig. 7, a switch operating bar 154 is attached to the injector plunger driver 96 and operates a safety switch 155 for introducing resistance into a circuit of the injector motor when the injector plunger nears the forward limit of its movement. A return limit switch 156 is operated by the rod 154 and stops the injector motor as the plunger completes its return movement. The molded articles are ejected from the mold 43 as the mold carriage is retracted, by ejector rods 156a and 156b (Figs. 1, 2, 3, 4, 13, 14) mounted on the machine frame. The middle rod 156a is in line with a rod 157a (Fig. 4a) which is mounted to move freely lengthwise through the tubular rod 143. The rod 157a is pushed forward by the rod 156a and operates through a rod 174 (Fig. 5) hereinafter described, to eject the molded articles. The rods 156b are arranged to engage a plate 158a (Figs. 1 and 5) and move the latter forward, thereby actuating ejector devices 158b.

Referring to Fig. 21, the electric motors and controlling devices are actuated by current from the mains a, b, c of a three-phase system. The operation of these devices will now be described. Assuming the mold carriage to be in its retracted position and the motors at rest, a push button switch 157 is actuated to complete a circuit through a coil 158, which operates to close a switch 159 in circuit with the field coils of the motors. This field circuit may be traced from the switch 159 through a conductor 160, switch 134, conductor 161, leads 162, through the motors and conductor 163 back to the switch 159. (The switch 135 in parallel with the switch 159 is at this time open.) A circuit for the rotors of the motors may be traced from the main b through conductor 164, reversing switch 165 (which at this time is in the dotted line position), conductor 166, to and through the motor windings and return wire 167 to main a. The motors M being thus energized drive the mold carriage in a forward direction. As the carriage commences its forward movement the switch 135 (Fig. 15) is actuated as its operating plunger runs off the cam 142, thus closing the switch as shown in Fig. 21 and by-passing the switch 159 so that the motor circuit is maintained after the push buttom switch is released. As the mold carriage nears the limit of its forward movement, the switch 134 (Figs. 15, 21) is opened by its cam 141 and introduces an impedance 134a into the motor circuit, thereby reducing the torque of the motors M. The motors are stopped by the resistance of the driving spindles 54 as the molds close but remain energized and apply a driving force which prevents any possible opening movement of the molds.

As the mold carriage reaches its forward position with the mold closed, the continued rotation of the spindle 54 (Fig. 3) causes the arm 131 to engage and close the switch 130 while the springs 123 are being compressed. Closing of the switch 130 establishes a circuit for a magnet coil 168, which circuit may be traced from the main b through conductor 169, switch 130, coil 168, and wires 170 and 172 to the main c. At the time the switch 130 is actuated the "right-of-way" switch 133 is in open position, having been opened by its cam 138 (Figs. 1, 15, 16, 21) as the mold completes its closing movement. The coil 168 being thus energized by closing of the switch 130, closes the return limit switch 156 which was opened by the rod 154 when the injector plunger was retracted during the preceding cycle of operations. The switch 156 is so constructed that it may be operated by the magnet coil 168 regardless of the position of the rod 154. Closing of the switch 156 establishes a circuit for the field windings of the injector motor I so that the latter is started in a forward direction, it being noted that the reversing switch 173 is at this time closed and in position to supply current for operating the motor in a forward direction. The motor I drives the injector plunger 90 forward, thereby forcing a charge of molding material through the injector into the closed mold. The plunger 90 is at the same time rotated by its motor 104 (Fig. 6) as heretofore described.

As the plunger approaches the limit of its forward movement, the switch 155 (Fig. 7) is actuated by the rod 154. The switch being thus opened introduces a resistance 155a into the motor circuit, reducing the torque and slowing down the motor. As the mold is filled the back pressure of the molding material stalls the motor but the motor circuits remain closed during the cooling and setting of the molding material so that the torque of the motor prevents any retraction of the plunger. When the switch 155 is opened, a switch 155b (Fig. 21) which may be mechanically connected thereto, is also opened and cuts off the current from the motor 104 so that the rotation of the plunger is discontinued until the switch 155 is again closed.

As the mold is filled the increasing pressure built up therein operates the Micro-switch 152 through the following mechanism. The rod 174 (Fig. 5) is mounted centrally of the mold for lengthwise movement and projects forward to the mold cavity and is thus subjected to an end pressure by the molding material. The rod is formed with a head 175 which is slidable in the plate 59 and arranged to abut the front face of the head 148 (Figs. 4a and 5). A coil spring 176 holds the rod 174 in said position. When a certain pressure has been built up within the mold, the rod 174 is moved lengthwise thereby and moves the rod 143 in opposition to the pressure of the spring 149 and thus actuates the Micro-switch 152. Adjustment of the plug 147 adjustably varies the amount of pressure of the molding material required to actuate the switch.

Referring now to Fig. 21, when the switch 152 is operated by the pressure of the molding material, a circuit is completed which may be traced from the main b through wires 169, 177, magnet coil 178 of a timer switch 179, wire 180, switch 152, holding coil 181 for switch 152, wire 182, switch 183, coil 184 of a timer switch 185, wire 186 to line wire c. As the closing of the switch 152 establishes a circuit through its magnet coil 181, said switch is held closed. The coil 178 for the timer switch 179 being energized operates to close the switch after a predetermined time limit, thereby establishing a circuit for the coil 187 of the reversing switch 173 for the injector motor. The switch 173 is thus reversed and reverses the motor I so that the injector plunger is retracted. As the closing of the switch 152 also energizes the timer coil 184, the timer switch 185 is also closed after a predetermined time limit. Closing of the switch 185 energizes the coil 188 which operates the reversing switch 165 for the motors M. The circuit for the coil 188 may be traced from the main b through conductors 169, 177, coil 178, conductors 180, 189, switch 185, wire 190, coil 188, wires 191 and 186 to main line c. The switch 165 being reversed reverses the motors M and thereby opens the molds.

As the mold carriage nears the limit of its retracting movement, the switch 135 is opened by its cam 142, thereby opening the field circuit for the motors M so that the latter are brought to rest. The opening movement of the switch 135 (Fig. 21) also opens the switch 183 connected thereto. This opens the circuit through the magnet coils 184 and 178 of the relay switches 185 and 179 respectively, also the magnet coil 181 of the switch 152. The relay switches and the switch 152 are thereby opened. The opening of these switches effects the operation of the reversing switches 165 and 173 preparatory to the succeeding cycle of operations.

The operation of the safety mechanism when any foreign material gets between the mold faces or obstructs the closing movement of the molds is as follows:

Such obstruction by resisting the forward movement of the mold carriage causes a compression of the springs 123 (Fig. 3) and actuates the switch 132. This may take place when a pressure of 100 or 200 lbs., for example, has been built up which is insufficient to injure the molds. This establishes a circuit which may be traced from the main line b through the switch 132, wire 192, switch 133, wire 192a, magnet coil 193 of a switch 194, wires 195 and 186 to line wire c. The switch 194 is now closed and completes a circuit for the coil 188 of the reversing switch 165. This circuit may be traced from the main line c through conductors 186, 191, coil 188, wire 197, switch 194, and conductors 198, 169, to main line b. The reversing switch 165 is therefore operated and reverses the motors M so that the mold carriage is withdrawn. The switch 132 is positioned to be actuated by the contact plate 131 before the latter reaches the switch 130, so that the switch 132 can effect the reversal of the motors M without operating the switch 130 which controls the injection motor I. The safety switch 132 can only function while the mold is in open position because the right-of-way switch 133 is opened as the mold closes. The switch cam 138 may be adjusted to open the switch 133, for example, when the mold faces are within two or three thousandths of an inch apart.

The means for automatically controlling and limiting the pressure built up in the mold by the expansion of the molding material comprises pressure relief elements 200 (Fig. 20) in the form of short headed pins or studs mounted in the plate 48c. The pins extend freely through said plate and their forward ends are flush with the surface of the mold wall. The pins are yieldingly held in this position by coil springs 202, the compression of which may be adjusted by screw-threaded plugs 203. When the pressure of the molding material reaches a predetermined limit due to expansion, the holding pressure of the springs is overbalanced so that the pins 200 recede to make room for the expanding material.

Modifications may be resorted to within the spirit and scope of the appended claims.

I claim:

1. A molding machine comprising a mold, injecting mechanism for injecting a molten plastic molding material into the mold, said mechanism including means providing a restricted passageway opening into the mold, a plunger for forcing the molding material through said passageway, means for driving said plunger and thereby forcing molding material into the mold, automatic means operable by back pressure built up within the mold when the mold cavity is filled to reduce the driving force applied to said plunger, and means independent of said plunger for automatically regulating the pressure within the mold and preventing excess pressure due to expansion of the molding material during cooling and setting thereof.

2. A molding machine comprising a mold, injecting mechanism for injecting a molten plastic molding material into the mold, said mechanism including means providing a restricted passageway opening into the mold, a plunger for forcing the molding material through said passageway, means for driving said plunger and thereby forcing the molding material into the mold, said plunger driving means including an electric motor, and automatic means separate from said plunger and operable independently thereof by back pressure developed in the mold after the latter is filled to reduce the torque of the motor and thereby reduce the force applied to the plunger.

3. An injection molding machine comprising a mold including partible mold sections, one of said sections being mounted for movement to and from the other section for closing and opening the mold, an electric motor, a screw-threaded shaft operatively connected to and driven by the motor, said shaft extending in the direction of said movement of the mold section, a nut threaded on said shaft and connected to the movable mold section for moving the latter, when the motor is operated, electro-responsive means operable automatically to introduce a resistance into a circuit of the motor as the movable mold section approaches mold closing position and thereby causing the motor to operate with a reduced driving torque applied to said shaft during the final closing movement of the mold section and thereafter holding the mold closed, and means for injecting molding material into the mold and building up a pressure therein while the mold is held closed under said reduced driving torque.

4. An injection molding machine comprising partible mold sections including a section having a stationary mounting and a movable section, a carriage on which said movable section is mounted, said carriage being mounted for reciprocating movement for moving said movable section to and from a mold closing position, a plurality of parallel screw shafts extending in the direction of said movement of the carriage, means for rotating the shafts, nuts threaded on said shafts and connected to the carriage, means providing a yielding connection between one of said nuts and the mold carriage by which a continued rotation of the associated shaft is permitted after the movable mold section is brought to mold closing position, an injection motor, and electro-responsive means operable by said nut during said continued movement to establish a circuit for said motor.

5. A molding machine comprising a framework including spaced abutments, a partible mold comprising a mold section mounted on and backed by one said abutment, a carriage on which the other mold section is supported, said carriage mounted between said abutments for reciprocation by which the mold section thereon is movable to and from a mold closing position, driving means for the carriage interposed between the carriage and the other said abutment, said driving means including a plurality of parallel screw-threaded shafts journalled in said last mentioned abutment and extending in the direction of movement of the carriage, said shafts being symmetrically arranged about the axis of the mold and positioned to effect a uniform distribution of the pressure at the meeting faces of the mold, nuts carried on said carriage and in which the shafts are threaded, electric motors individual to said shafts, gearing providing driving connection between the motors and shafts, means providing a yielding connection between one of said nuts and the carriage, permitting a limited continued movement of the said one nut by its driving shaft after the mold is closed, an injection motor, and electro-responsive means actuated by the nut during said limited movement to effect the operation of said injection motor.

6. A molding machine comprising a framework including spaced abutments, a partible mold comprising a mold section mounted on and backed by one said abutment, a carriage on which the other mold section is supported, said carriage mounted between said abutments for reciprocation by which the mold section thereon is movable to and from a mold closing position, driving means for the carriage interposed between the carriage and the other said abutment, said driving means including a plurality of parallel screw-threaded shafts journalled in said last mentioned abutment and extending in the direction of movement of the carriage, nuts carried on said carriage and in which the shafts are threaded, electric motors individual to said shafts, gearing providing driving connection between the motors and shafts, means providing a yielding connection between one of said nuts and the carriage, permitting a limited continued movement of the said one nut by its driving shaft after the mold is closed, an injection motor, an injection plunger driven thereby, electro-responsive means actuated by the nut during said limited movement to establish a circuit for the injection motor and cause it to drive said plunger, and means to introduce an impedance into the injection motor circuit by which the driving torque of the motor is reduced, permitting a reduced driving torque to be applied to the injection plunger and maintained after the injection motor is brought to rest.

7. A molding machine comprising separable mold sections, an electric motor, mechanism providing a driving connection between the motor and a mold section for moving the latter to and from mold closing position, said mechanism including a yieldable element permitting continued operation of the motor independently of movement of the mold section toward its closed position in the event of an obstruction offering abnormal resistance to the mold closing movement, electro-responsive means operated by said element to control and stop the motor, and automatic mechanism for preventing the operation of said last mentioned means while the mold is closed.

8. A molding machine comprising a mold having separable sections, one of which has a stationary mounting, a carriage on which the other mold section is carried, means for reciprocating the carriage and thereby moving the mold section thereon to and from the stationary mold section, said means for reciprocating the carriage comprising an electric motor, a screw shaft driven thereby, a stationary support in which said shaft is journalled for rotation, a nut threaded on the shaft, said nut mounted on the mold carriage, springs providing a yielding connection between said nut and the carriage and through which the driving force is transmitted for moving the carriage to mold closing position, said springs offering a resistance to compression sufficient to permit normal closing of the mold without relative movement of said nut and carriage and yieldable under an abnormal resistance to the mold closing movement of the carriage, thereby permitting a forward movement of the nut relative to the carriage when there is an obstruction between the mold sections, and electro-responsive means actuated by said nut during said relative movement for controlling and stopping the motor.

9. An injection molding machine comprising a mold, an injector comprising a heating chamber, the latter providing an annular passageway having a forward end portion converging into a restricted outlet which opens into the mold cavity, means for introducing charges of molding material into said chamber, a tubular plunger, means for moving the plunger forward in said passageway and thereby forcing the material into the mold, and means for rotating the plunger during its forward movement and thereby distributing the material circumferentially within said passageway, the forward end of the plunger being provided with projections to engage and insure an effective distribution of the molding material.

10. A molding machine comprising a mold, means for introducing a plastic molding material into the mold and building up a predetermined pressure within the mold, a wall of the mold being provided with a restricted passageway leading from the mold cavity to receive excess material, automatic means cooperating with said passageway to prevent excess pressure being built up within the mold by expansion of the molding material therein, said automatic means comprising an element movable in said passageway toward the mold cavity, a stop positioned and arranged to limit said movement and prevent said element from entering the mold cavity, a spring held under compression and holding said element against the stop while the mold cavity is being filled and a predetermined normal pressure is built up therein and permitting retractive movement of said element when said normal pressure is exceeded, and adjusting mechanism for adjusting the compression of said spring and thereby adjustably varying the amount of pressure required to retract said element, whereby the maximum degree of pressure built up within the mold may be adjustably varied.

11. A molding machine comprising a mold having a mold cavity, means for introducing a plastic material into the mold and filling the mold cavity, pressure controlling means comprising a pressure relief element, the mold being formed with a restricted passageway leading from the mold cavity and in which said element is mounted for movement toward and from the mold cavity, means for holding said element in a position exterior to the mold cavity throughout the filling of the mold cavity, yielding means providing a backing for said element and permitting the latter to recede after the mold cavity is filled and when a predetermined pressure is developed within the mold, and adjusting means for adjustably varying the pressure at which said element will yield under the pressure developed within the mold.

12. An injection molding machine comprising a mold, an injection nozzle formed with an annular passageway extending therealong, the forward end portion of said passageway being tapered and converging into a restricted opening extending to the mold cavity, means for supplying molding material to said passageway, a plunger in said passageway, means for moving the plunger toward the mold and thereby forcing said material into the mold cavity, and means for rotating the plunger while it is moving toward the mold and thereby causing a uniform distribution of the material circumferentially within said passageway.

13. An injection molding machine comprising a mold, an injection nozzle formed with an annular passageway extending therealong, the forward end portion of said passageway being tapered and converging into a restricted opening extending to the mold cavity, means for supplying molding material to said passageway, a plunger in said passageway, means for moving the plunger toward the mold and thereby forcing said material into the mold cavity, and means for rotating the plunger while it is moving toward the mold and thereby causing a uniform distribution of the material circumferentially within said passageway, the forward end of the plunger being provided with means for imparting a rotative movement to the molding material.

14. An injection molding machine comprising a mold, an injection nozzle formed with an annular passageway extending therealong, the forward end portion of said passageway being tapered and converging into a restricted opening extending to the mold cavity, means for supplying molding material to said passageway, a plunger in said passageway, means for moving the plunger toward the mold and thereby forcing said material into the mold cavity, means for rotating the plunger while it is moving toward the mold and thereby causing a uniform distribution of the material circumferentially within said passageway, and heating means enveloping said passageway whereby the latter serves as a heat chamber within which the molding material is heated and plasticized.

15. An injection molding machine comprising a mold formed with a mold cavity, a wall of the mold being formed with a channel which opens into the mold cavity, means for injecting a molding material into the mold and filling said cavity, pressure regulating means for controlling the pressure built up within the mold and preventing excess pressure, said means including a pressure relief element mounted for movement within said channel toward and from the mold cavity, said element comprising a stop device operative to positively limit the movement of said element toward the mold cavity and hold it outside of the mold cavity, a spring providing a backing for said element and holding it in its forward position while the molding material is injected and fills the mold cavity, said pressure relief element being movable backward against the force of said spring by the molding material when a predetermined pressure is built up within the mold and thereby providing for expansion for the molding material and regulation of said built-up pressure.

16. An injection molding machine comprising a mold having a mold cavity, means for injecting plastic molding material into the mold and filling the mold cavity, an electric motor for driving the injecting means, a pressure operated device separate from the injecting means and positioned and arranged to contact with the molding material in the mold, said device being movable under pressure applied thereto by the molding material when the mold has been filled and the pressure built up to a predetermined degree, spring means providing a backing for said device and opposing said retracting movement, a switch operated by said device when the latter is retracted, and electro-responsive means controlled by said switch for reducing the driving force of the motor when the switch is operated.

17. A molding machine comprising a mold having a mold cavity, injecting mechanism for injecting a molten plastic molding material into the mold cavity, said mechanism including means providing a restricted passageway opening into the mold cavity, a plunger for forcing the molding material through said passageway, an electric motor operatively connected to drive said plunger and thereby force molding material into the mold, a pressure regulating device separate from said plunger and positioned to contact with the molding material in the mold and mounted for retractive movement, spring means providing a backing for said device and opposing such movement, said device being retractable by a predetermined pressure of the molding material, and electro-responsive means actuated by said device for controlling a circuit of the motor and reducing the torque of the motor applied to said plunger.

18. An injection molding machine comprising a mold having separable sections, means for relatively moving said sections to and from a position in which the mold faces meet and thereby closing and opening the mold, said means including a screw-threaded shaft, an electric motor connected to rotate said shaft, means forming a driving connection between said screw shaft and a section of the mold for moving said section to mold closing position, automatic means brought into operation when the mold section reaches a predetermined position as it approaches mold closing position to reduce the forward driving torque of the motor and maintain a reduced driving torque during a predetermined final portion of the mold closing movement and after the motor has stopped for holding the mold closed, and means for injecting molding material into the mold and building up a pressure therein while the mold is held closed under said reduced driving torque.

19. An injection molding machine comprising partible mold sections including a section having a stationary mounting and a movable section, a carriage on which said movable section is mounted, said carriage being mounted for reciprocating movement for moving said movable section to and from a mold closing position, a plurality of parallel screw shafts having a stationary mounting and extending in the direction of said movement of the carriage, nuts threaded on said shafts and connected to the carriage, electric motors individual to said shafts, gearing connecting the motors to the respective shafts, said shafts being symmetrically arranged about the axis of the mold to impart a uniformly distributed driving pressure to the mold sections, electro-responsive means operable automatically as the mold is closed to reduce the driving torque of said motors, and means for injecting a plastic molding material into the mold and building up a predetermined pressure therein while said reduced torque is maintained.

20. A molding machine comprising a framework including a rear abutment and a forward abutment, each of said abutments comprising a vertically disposed plate, said abutments being spaced horizontally and having vertical faces, a partible mold including a stationary section mounted on the face of said forward abutment, and a mold section movable to and from said stationary section for closing and opening the mold, a carriage on which said movable section is mounted, said carriage being mounted on said framework for horizontal reciprocating movement between said abutments for opening and closing the mold, said carriage comprising a vertical face plate on which said movable section is mounted and horizontal cylinders formed integrally therewith, said cylinders being symmetrically arranged about the axis of the mold and extending rearwardly from said face plate, screw-threaded nuts carried at the outer ends of said cylinders, screw shafts threaded through said nuts and extending into said cylinders, said shafts being journalled in said rear abutment, thrust bearings interposed between said shafts and said rear abutments, and means for rotating said shafts.

21. A molding machine comprising partible mold sections having meeting faces, means comprising a power motor for moving one section toward the other and thereby closing the mold, and safety means operable by said motor when a predetermined abnormal resistance to the mold closing movement of the moving mold section is encountered to deenergize said motor before the mold closing movement is completed, and automatic means for preventing the operation of said safety means while the mold is closed.

22. A molding machine comprising sections relatively movable to and from each other for closing and opening the mold, an electric motor, power transmitting mechanism providing driving connections between the motor and a mold section for moving the latter to mold closing position, said mechanism including a movable element and a compression spring permitting said movable mold section to be arrested by a predetermined resistance to its normal closing movement while said element continues its movement against the compressive force of the spring, and an electro-responsive device controlling the motor and arranged to be operated by said element during said continued movement and thereby cut off the driving power of the motor, and automatic means brought into operation by the final closing movement of said movable mold section for rendering said electro-responsive device ineffective.

23. An injection molding machine comprising a mold, injection mechanism for injecting a molten plastic molding material into the mold including an injection plunger, a motor for driving the plunger, a pressure operated device independent of the plunger and mounted in position to be operated by pressure of the molten plastic within the mold cavity, and electro-responsive means operated by said device when the pressure of the molten plastic within the mold cavity reaches a predetermined degree, said electro-responsive means being operable to control the motor and reduce the driving force applied by the motor to said plunger.

24. An injection molding machine comprising a sectional mold including a section movable to and from the other section for closing and opening the mold, a power driven motor, means providing driving connections between the motor and said movable mold section for closing the mold and building up a holding pressure, said driving connections including safety means through which pressure is applied to the movable mold section, said safety means being operable by a predetermined back pressure of the movable mold section to cut off the driving power from the motor and stop the motor, and thereby prevent a pressure equal to said holding pressure from being built up in the event of obstructing material between the mold sections interfering with the normal closing of the mold, and automatic means brought into operation during the final closing movement of the mold for rendering said safety means ineffective and thereby permitting said holding pressure to be built up while the mold is closed.

25. An injection molding machine comprising a mold including sections relatively movable to and from each other for closing and opening the mold, a motor, mechanism for transmitting motion from the motor to a mold section for closing the mold and applying a holding pressure to the mold, and electro-responsive means operated automatically by back pressure of the mold developed during its closing movement when an abnormal resistance is offered to such movement, said electro-responsive means being operable to cut off the driving power of the motor and thereby stop the motor and prevent an objectionable mold closing pressure being applied to the mold, and means brought into operation during the final closing movement of the mold to render said electro-responsive means inoperative to control the motor.

26. A molding machine comprising partible mold sections, a power motor, means driven thereby for relatively moving said sections for closing and opening the mold and for holding the mold closed, safety means operable automatically by a predetermined pressure applied thereto, said safety means being arranged to receive the back pressure of a mold section caused by a predetermined resistance to the closing movement thereof before the normal closing movement is completed, said safety means being operable to cut off the power and thereby prevent the application of excessive pressure to the mold sections when an obstruction between the mold sections interfers with the normal closing movements of the mold, and automatic means brought into operation during the final closing movement of the mold for rendering said safety means ineffective while the mold is closed.

27. A molding machine comprising a sectional mold including a section movable to and from the other section for closing and opening the mold, a power motor, transmitting means between the motor and said movable section through which movement is transmitted to the said movable section for closing the mold, said transmitting means including a movable element, a compression spring between said element and the movable section of the mold, said spring being compressible under pressure developed when an obstruction to the closing movement of the mold offers an abnormal resistance to such movement, means arranged to be operated by the movement of said movable element during said compression of the spring to cut off the driving power from the motor and thereby prevent excessive pressure between the mold sections, and automatic means by which the final closing movement of the mold takes the motor out of the control of said movable element.

28. A molding machine comprising a sectional mold, one section of the mold being movable toward and from the other for closing and opening the mold, a motor operatively connected to said movable section, and safety means operable when an obstruction is interposed between the mold sections for automatically preventing a normal mold closing pressure from being applied to the movable section, said safety means including a device through which power is transmitted from the motor to said movable section, said device being operable by a predetermined back pressure of the mold, means actuated by said device for reducing the pressure applied by the motor to the movable mold section, and means for taking the motor out of the control of said device as the mold sections are brought together and thereby permitting an increased pressure to be applied by the motor to the movable mold section.

29. A molding machine comprising a sectional mold, one section being movable to and from the other for closing and opening the mold, a motor, power transmitting means between the motor and said movable section for moving the latter to mold closing position, said power transmitting means including a safety device through which the power is transmitted, said safety device being operable by a predetermined force applied thereto by the motor when an obstruction prevents a free movement of the movable mold section toward mold closing position, means operable by said safety device to prevent a normal mold closing pressure from being applied to the movable mold section, and means for rendering said safety device ineffective while the mold is closed and thereby permitting the application of said normal closing pressure to the movable mold section.

CONRAD JOBST.